Feb. 27, 1973  W. E. PENLEY  3,718,226
SPARE TIRE MOUNT FOR PICKUPS
Filed Dec. 8, 1971
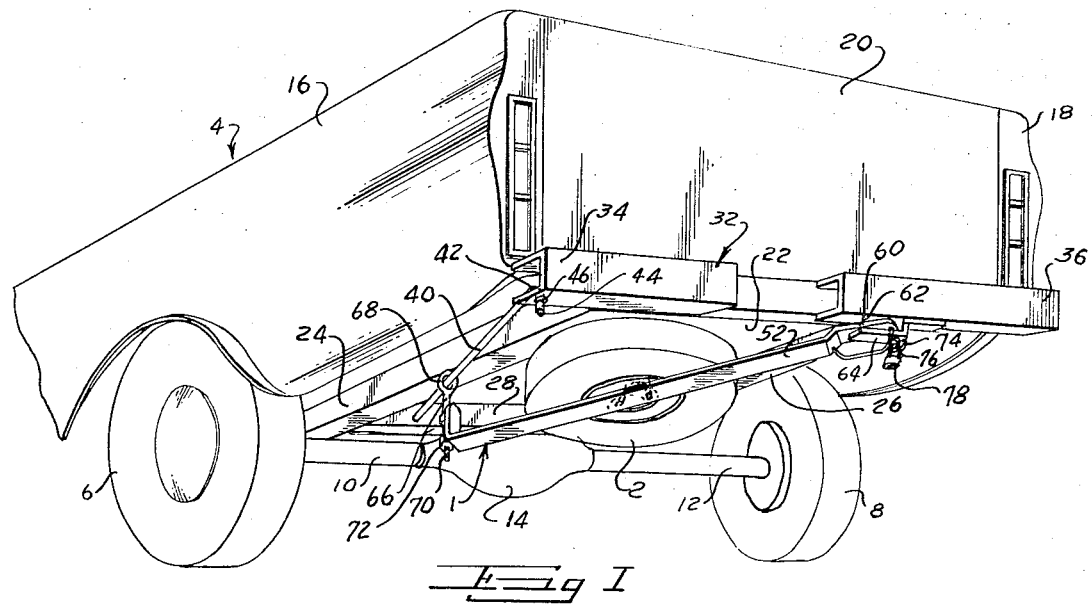
Fig I
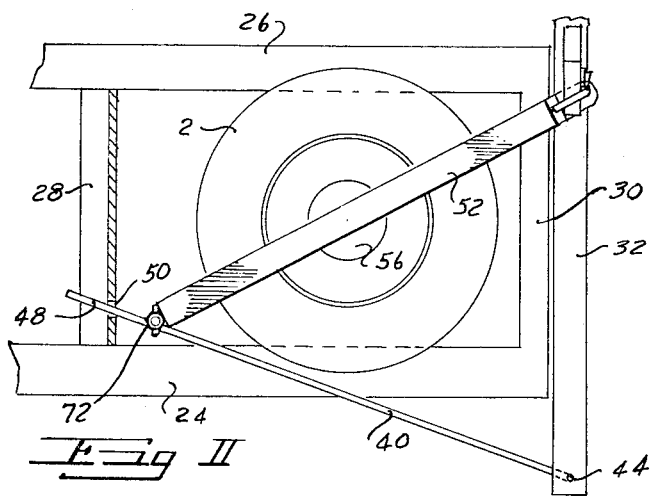
Fig II
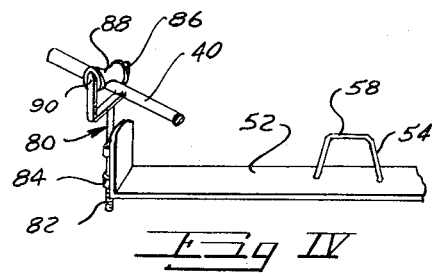
Fig IV
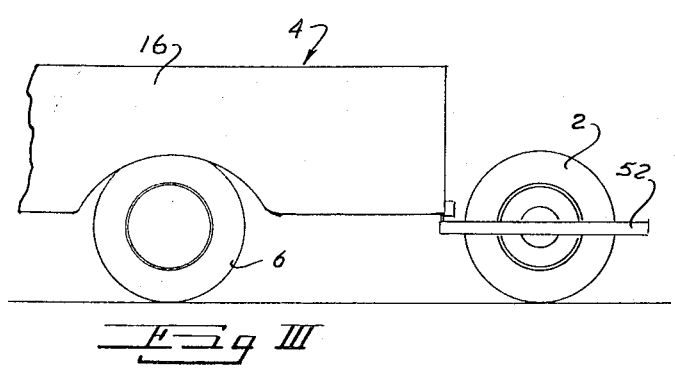
Fig III
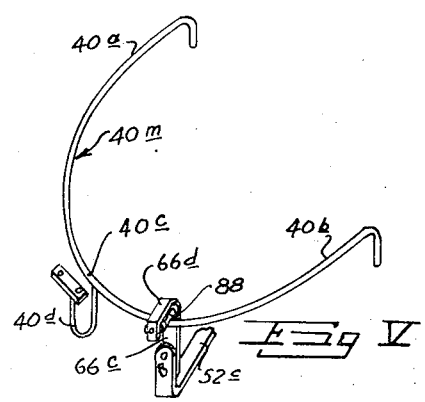
Fig V
INVENTOR
WALTER ELMO PENLEY
BY Howard E. Moore
Gerald G. Crutsinger
ATTORNEYS

United States Patent Office 3,718,226
Patented Feb. 27, 1973

3,718,226
SPARE TIRE MOUNT FOR PICKUPS
Walter E. Penley, 1104 Emerson Lane,
Denton, Tex. 76201
Filed Dec. 8, 1971, Ser. No. 205,844
Int. Cl. B60r 9/00
U.S. Cl. 214—451                                    15 Claims

ABSTRACT OF THE DISCLOSURE

A carrier for supporting a spare tire and wheel assembly beneath the chassis frame of a vehicle adapted to permit lineal movement of the assembly from beneath the vehicle and rotational movement of the assembly to orient the assembly in a vertical position. The wheel assembly is carried by a support bar having one end detachably secured to the rear bumper of the vehicle and another end slidably disposed on a guide bar. The guide bar has one end secured to the chassis frame of the vehicle and another end secured to the rear bumper of the vehicle.

BACKGROUND OF INVENTION

Spare tire and wheel racks have been devised heretofore which comprise a carriage mounted in a drawer-like fashion to be drawn from beneath the body of the vehicle to allow removal of a spare tire and wheel assembly.

Such devices have not been commercially successful for several reasons. Structural members of vehicle chassis frames vary in size, shape and spacing. Since it was generally necessary to support spaced parallel tracks adjacent opposite sides of the carriage, difficulty was encountered in attaching the tracks in the required manner to provide a straight unobstructed passageway through which the spare tire and carriage could be moved. Further, since tires vary in diameter and thickness, difficulty was encountered in attaching the spare tire to the carriage in a manner to prevent rattling.

Such devices generally had two rollers which moved along tracks and the rollers had to be maintained in a properly oriented relationship with the tracks to prevent binding and to prevent disengagement of the rollers from the tracks.

After the drawer-like support structure was extended, moving the spare tire from under the vehicle, the tire had to be manually lifted from the support and the flat tire had to be lifted and properly oriented thereon. Considering the size and weight of a mounted spare tire and the fact that such is generally covered with dirt and grime, handling the tire was undesirable and sometimes dangerous when a tire had to be changed adjacent a roadway traveled by high speed vehicles.

SUMMARY OF INVENTION

I have developed a carrier for supporting a spare tire and wheel assembly comprising a single guide bar connectable to the underside of a vehicle and preferably extending from a position adjacent an end of the rear bumper in a direction generally toward the differential of the rear axle assembly on most makes and models of pickup trucks. The particular method of securing the support bar under the vehicle allows installation of a standardized unit on substantially all pickup trucks regardless of make and model.

A support bar has an outer end detachably secured to the rear portion of the vehicle, preferably to a central portion of the rear bumper, and an inner end slidably secured to the guide bar. The inner end of the support bar is preferably suspended from a threaded projection, extending upwardly from the support bar and having an aperture formed therein through which the guide bar extends.

The support bar and guide bar are connected together such that the support bar is movable longitudinally of the guide bar and is also pivotable about the guide bar allowing movement of a spare tire and wheel assembly, secured to the support bar, to be pivoted from a position wherein the axis of the wheel is substantially vertical, to a position wherein the axis of the wheel is substantially horizontal.

A primary object of the invention is to provide a carrier for supporting a spare tire and wheel assembly below the under-body of a pickup truck, said carrier being universally connectable to various makes and models of vehicles regardless of the size and spacing of under-body rear rails and cross-members of the chassis.

Another object of the invention is to provide a carrier for supporting a spare tire and wheel assembly comprising a single guide bar supporting an end of a support bar to which the tire and wheel assembly are secured, eliminating difficulties heretofore encountered in spacing and alignment of structural members of devices having dual guide rails or tracks.

A further object of the invention is to provide a carrier for supporting a spare tire and wheel assembly wherein adjustable means is provided for securing a support bar, carrying a tire and wheel assembly, to a guide bar allowing substantially infinite adjustment of the spacing between the inner end of the support bar and the guide bar within predetermined limits.

A still further object of the invention is to provide a carrier for supporting a spare tire and wheel assembly comprising a minimum number of structural members providing a spare tire mount the use of which is economically feasible.

A still further object of the invention is to provide a carrier for supporting a spare tire and wheel assembly particularly adapted to allow movement of the tire and wheel assembly from a storage position beneath the underframe of the vehicle to a position spaced from the vehicle, allowing attachment and disengagement of a tire and wheel assembly therefrom while the wheel is positioned such that the axis of the wheel is substantially horizontally disposed.

Other and further objects of the invention will become apparent upon referring to the detailed description hereinafter following and the drawings annexed hereto.

DESCRIPTION OF DRAWINGS

Drawings of a preferred embodiment of the invention are annexed hereto so that the invention may be better and more fully understood, in which:

FIG. I is a fragmentary perspective view of the rear of a pickup truck having the spare tire mount secured thereto;

FIG. II is a plan view of the bottom of the vehicle illustrated in FIG. I;

FIG. III is a fragmentary side elevational view of the rear of the vehicle, the spare tire mount being positioned to engage or disengage a spare tire therefrom;

FIG. IV is a perspective view of a modified form of the connector; and

FIG. V is a perspective view of a modified form of guide bar.

Numerical references are employed to designate like parts throughout the various figures of the drawings.

DESCRIPTION OF A PREFERRED EMBODIMENT

Referring to FIG. I of the drawing the numeral 1 generally designates a carrier for supporting a spare tire and wheel assembly below the underframe of the chassis of a conventional vehicle, such as a pickup truck 4.

The pickup truck 4 is of conventional design having rear wheels 6 and 8 mounted on outer ends of rear axle drive shafts 10 and 12, respectively. Each drive shaft is connected by suitable means (not shown) to a differential 14. A suitable suspension system (not shown) is employed for securing opposite sides of the body of the vehicle to rear axle drive shafts 10 and 12 in conventional manner.

The body of the vehicle, comprising side walls 16 and 18, tail gate 20 and floor 22, is connected to a conventional chassis, which in the embodiment of my invention illustrated in the drawing comprises under-body outer rails 24 and 26 joined by suitable cross-members 28 and 30.

A rear bumper 32 extends across the rear end of the vehicle and is connected by suitable brackets to the rearmost cross-member 30 of the underframe of the chassis and has ends 34 and 36 disposed adjacent opposite sides of the vehicle.

The carrier for supporting the spare tire assembly 2 comprises a guide bar 40 having an outer end 42 secured by suitable means to the outer extremity of the vehicle, preferably adjacent the end 34 of bumper 32. In the particular embodiment of the invention illustrated in FIG. I, guide bar 40 has a deflected downwardly extending portion 44 on the outer end 42 thereof positionable in an aperture 46 in bumper 32.

The inner end 48 of guide bar 40 extends in a direction generally toward the differential 14 of the vehicle and is secured by suitable means to the frame. In the particular embodiment of the invention illustrated in FIGS. I and II of the drawing the inner end 48 of guide bar 40 extends through an aperture 50 extending through cross-member 28 which has opposite ends secured to outer rails 24 and 26.

It should be appreciated that the inner end 48 of guide bar 40 may be secured to the frame of the vehicle by any suitable means, for example by a shackle or U-bolt, to rail 24 or to the floor 22 of the vehicle.

The specific mounting apparatus may be adapted to the existing structural configuration of the underframe of the vehicle. However, in most applications the inner end 48 of bar 40 can be secured to the frame of the vehicle by drilling an aperture in an existing structural member and inserting the end of the guide bar therethrough.

It should further be appreciated that while guide bar 40, in the embodiment of the invention illustrated in FIG. I of the drawing, is substantially straight the guide bar may be deformed or bent as deemed expedient to facilitate attachment thereof to the vehicle.

Support bar 52 has means intermediate opposite ends thereof for detachably securing the wheel thereto. Such means in the embodiment of the invention as illustrated in the drawing comprises a bar 54 formed in a U-shaped configuration and having downwardly extending legs, the lower ends of which are welded or otherwise secured to the central section of support bar 52. The upwardly extending portion of U-shaped bar 54 extends through the central opening formed in the center section or spider 56, of the wheel.

The legs of the U-shaped bar 54 are preferably upwardly converging such that the extremities of the bar, which are welded or otherwise secured to support bar 52, are spaced further apart than the upper ends thereof joined by the connector portion 58.

Interengaging means is provided to disengageably secure the outer end of the support bar 52 relative to the vehicle. As best illustrated in FIG. II, the outer end of support bar 52 is preferably deflected forming an offset portion 60 adapted to slide into the slot 62 between lug 64 and the lower surface of the bumper 32. The lug 64 is secured to the bumper by any suitable means such as by bolts or by welding.

The inner end of support bar 52 has means secured thereto for movably securing same to guide bar 40. In the embodiment of the invention illustrated in FIG. I an upwardly extending projection, such as an I-bolt 66, has an aperture 68 formed therein through which support bar 40 extends. The projection 66 is preferably adjustably secured to the end of support bar 52, providing adjustment of the distance between the end of support bar 52 and guide bar 40. Suitable adjusting means comprises a threaded portion 70 on the lower end thereof engageable with suitable threaded means, such as nuts 72 welded or otherwise secured to the inner end of support bar 52.

It should be readily apparent that by adjusting the distance between guide bar 40 and the upper surface of support bar 52 the carriage for supporting a spare tire and wheel assembly 2 can be adjusted such that the tire sidewall area will be urged into engagement with lower surfaces of side rails 24 and 26 of the vehicle frame or into engagement with the floor 22 of the vehicle, depending upon the size of the tire and the spacing of rails 24 and 26.

From the foregoing it should be readily apparent that I have developed a carrier for supporting a spare tire and wheel assembly which can be installed on most pickup trucks by merely drilling an aperture 46 adjacent the end of the bumper 32, or through other existing body members such as cross member 30 of the frame, and by drilling an aperture 50 through cross-member 28. Lug 64 may be secured to the bumper 32, or to cross-member 30 as desired, completing the installation. If it is expedient to do so suitable locking means such as a key or lock nut may be secured to projection 44 and to the inner end 48 of guide bar 40 to securely lock same in place. However, in most installations such is not necessary because the downward force exerted by the tire, which is grippingly engaged between support bar 52 and rails 24 and 26 of the frame, exerts sufficient downward force to prevent disengagement of the projection 44 on the end of the guide bar from the aperture 46 when the deflected portion 60 on the outer end of support 52 is engaged in the slot 62 between lug 64 and the bumper.

To prevent theft, loops 74 and 76 are formed on the outer end of support bar 52 and lug 64, respectively, for receiving a shackle of a conventional padlock 78.

A modified means for connecting support bar 52 to guide bar 40 is illustrated in FIG. IV of the drawing. Projection 80 has a threaded lower portion engageable with nuts 84 for adjustably securing projection 80 to the end of support bar 52.

Anti-friction means such as a roller 86, having a circumferentially grooved portion 88, is provided in rolling engagement with the guide bar 40 and secured to the upper forked portion of projection 80 by suitable means such as a pin 90.

From the foregoing it should be readily apparent that a spare tire and wheel assembly 2 may be moved from the position illustrated in FIG. I, wherein the axis of the wheel is substantially vertical, to the position illustrated in FIG. III, wherein the axis of the wheel is substantially horizontal, by disengaging the offset portion 60 of the carrier from lug 64, allowing support bar 52 to pivot downwardly a distance sufficient to disengage the upper surface of the sidewall of the tire from rails 24 and 26 allowing movement of the connector means 66 or 86 longitudinally relative to guide bar 40 for positioning the tire and wheel assembly to behind the vehicle. The connector 66 (FIG. I) or 86 (FIG. IV) may then be rotated about the guide bar positioning the tire wheel assembly as illustrated in FIG. III. The spare time may then be rolled to the side of the vehicle for mounting.

In the embodiment illustrated in FIG. V the guide bar 40m is curved and has extremities 40a and 40b secured to spaced portions of the vehicle. The central section 40c is secured by suitable means such as hanger 40d to the floor 22 of the vehicle. The connector 66c has a hook 66d permitting movement of the inner end of support bar 52c along either extremity 40a or 40b to move the tire and wheel assembly toward either end 34 or end 36 of bumper 32, hook 66d being disengageable from the guide bar 40m permitting complete removal of support bar 52c from the vehicle, if desired.

Employment of curved guide bar 40m allows movement of the tire to the side of the vehicle which is not raised by a jack to change a wheel.

It should be appreciated that the foregoing is a description of a preferred embodiment of my invention and that other and further embodiments may be devised without departing from the basic concept of my invention. For example, I contemplate that guide rail 40 may be mounted, if it is deemed expedient to do so, such that it extends parallel to the central axis of the vehicle or perpendicular thereto and that the spare tire assembly 2 may be moved longitudinally of the vehicle or transversely thereof as deemed expedient.

Having described my invention I claim:

1. A spare tire support comprising, guide means; means to secure the guide means under a vehicle; support means; means to secure a tire to the support means; connector means to movably secure a first end of the support means to the guide means, said connector means being adapted to permit movement of the first end of the support means in a direction parallel to the axis of the guide means and to permit rotational movement of said first end about the axis of the guide means; and means to detachably secure a second end of the support means relative to the vehicle.

2. The combination called for in claim 1 wherein the guide means comprises a guide rod and the connector means comprises an upwardly extending projection having an aperture formed therein through which the guide rod extends and wherein the aperture has a diameter greater than the diameter of the rod.

3. The combination called for in claim 2 wherein the projection comprises a threaded member and with the addition of threaded means on the support means to adjustably secure the threaded projection relative to the support means.

4. The combination called for in claim 1 wherein the support means comprises an elongated member adapted to extend across a tire; and wherein the means to secure the tire to the support means comprises a protrusion extending upwardly from a central portion of the elongated member, said protrusion being positioned to extend into an opening in a central section of a wheel upon which the tire is mounted.

5. The combination called for in claim 1 wherein the guide means comprises a rod and the connector means comprises an outwardly extending projection adjacent the first end of the support means, said projection having anti-friction means secured thereto and engageable with the rod.

6. Apparatus to mount a spare tire under a vehicle comprising, a guide bar; means to secure a first end of the guide bar to the frame of the vehicle adjacent the longitudinally extending centerline of the vehicle; means to secure a second end of the guide bar adjacent a rear corner of the frame of the vehicle such that the axis of the guide bar is angularly disposed relative to the longitudinally extending centerline of the vehicle; support means; means to secure a tire to the support means; connector means to movably secure the support means to the guide bar, said connector means being adapted to permit movement of the first end of the support means in a direction parallel to the axis of the guide bar and to permit rotational movement thereof about the axis of the guide bar; and means to detachably secure a second end of the support means relative to the vehicle.

7. The combination called for in claim 6 with the addition of means to adjustably secure the connector means to the support bar permitting adjustment of spacing between the end of the support means and the guide bar.

8. The combination called for in claim 6 wherein the connector means comprises an upwardly extending projection having an aperture formed therein through which the guide bar extends.

9. The combination called for in claim 6 wherein the connector means comprises an upwardly extending projection having forked upper leg portions between which the guide bar extends; and with the addition of a roller secured between the forked legs of the projection in rolling engagement with the guide bar.

10. The combination called for in claim 6 wherein the means to secure a tire to the support means comprises a U-shaped bar having extremities secured to a central portion of the support means and positionable through an opening in a central portion of a wheel.

11. The combination called for in claim 1 with the addition of anti-friction means on said connector means in engagement with the guide means.

12. The combination called for in claim 1 wherein the guide means comprises a curved bar having extremities connectable to spaced portions of a vehicle; hanger means to secure an intermediate section of the bar under a vehicle; and said connector means comprising a hook adapted to move unobstructed along the intermediate section of the bar.

13. The combination called for in claim 1 wherein the connector means comprises projection means secured to the first end of the support means; and roller means rotatably secured to the projection means, said roller means being movable along said guide means.

14. The combination called for in claim 13 with the addition of means to adjustably secure said projection means to said support means.

15. The combination called for in claim 1 wherein the connector means comprises a hook secured adjacent the first end of the support means and adapted to disengageably suspend the first end of the support means from the guide means.

References Cited

UNITED STATES PATENTS 3,369,683  2/1968  Richards _____ 214—454

GERALD M. FORLENZA, Primary Examiner

J. MANNIX, Assistant Examiner

U.S. Cl. X.R.

214—454